Dec. 16, 1958     F. W. TAYLOR     2,864,466
BRAKES FOR CYCLES
Filed Jan. 9, 1956     2 Sheets-Sheet 1
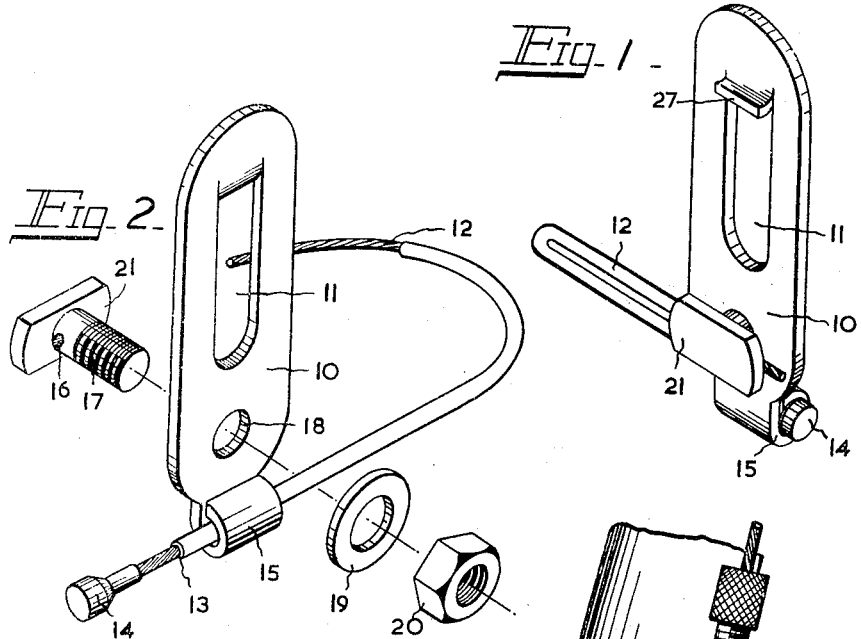
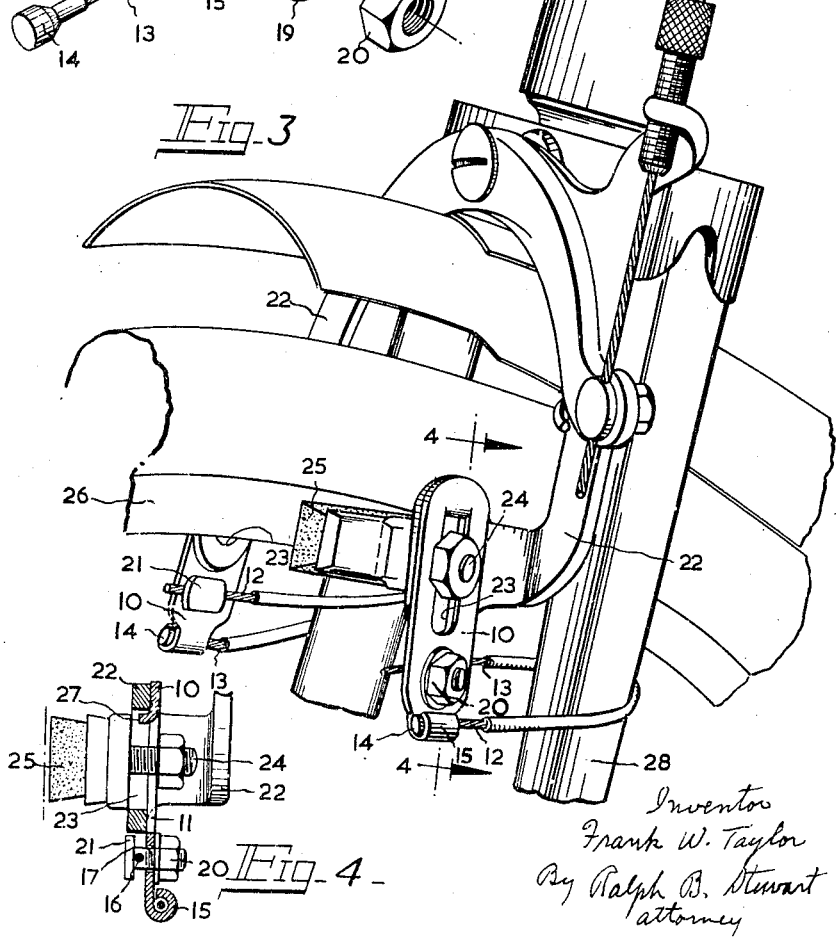

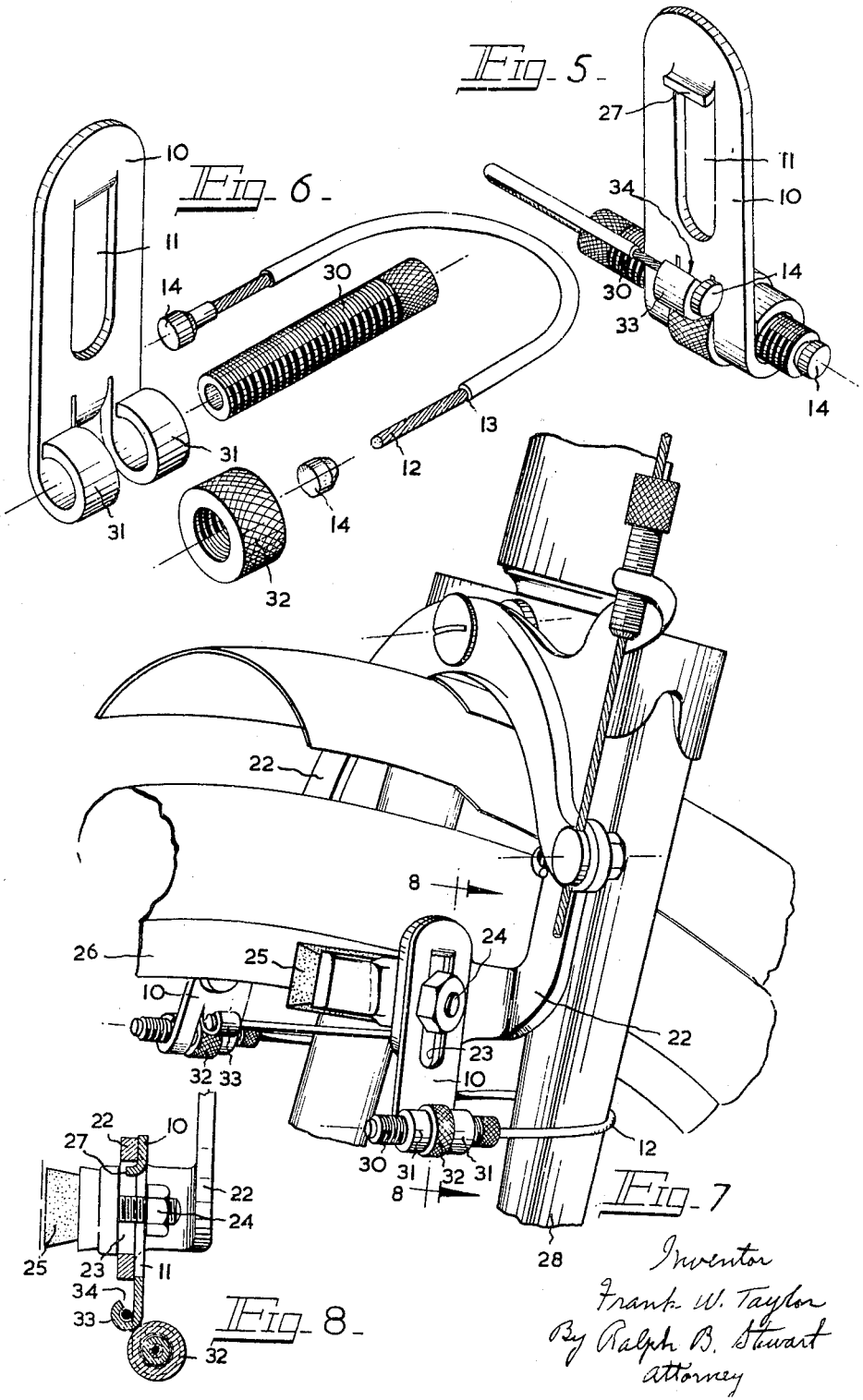

United States Patent Office 2,864,466
Patented Dec. 16, 1958

2,864,466

BRAKES FOR CYCLES

Frank Walter Taylor, Birmingham, England, assignor to H. C. Webb & Company Limited, Birmingham, England, a British company Application January 9, 1956, Serial No. 558,162

Claims priority, application Great Britain September 8, 1955

5 Claims. (Cl. 188—24)

This invention relates to brakes for cycles. The invention is particularly applicable to rim brakes of the kind comprising a pair of cooperating caliper-like levers carrying brake blocks for engaging the rim of a cycle wheel and pivotally mounted on a fixed pin or stud engaging wheel-supporting means such as the front fork, of the cycle frame. In a front brake the pin or stud is usually mounted in and projects forwardly from the fork crown, the brake being mounted in front of the fork. When the brake is applied, by closing the caliper-like levers upon the rim, the braking force on the brake blocks tends to carry the lower ends of the cliper-like levers forwardly away from the fork blades and the whole of this force is transmitted as a bending moment on the mounting pin or stud which may be bent or damaged by sudden or severe braking.

To overcome this it has been proposed to connect the caliper-like levers or the holders for the brake blocks to the fork blades by stabilising links which prevent forward movement of the brake blocks under braking force when the brake is applied, but stabilising links hitherto proposed have been liable to interfere with the normal movements of the caliper levers.

An object of the present invention is the provision of a pair of anchorage devices having means for adjustaby mounting them one on each caliper-like lever, each anchorage device including a flexible loop for embracing a wheel supporting member.

A further object of the invention is the provision of attachment means for mounting on the end of each caliper-like lever adjacent the brake block carried thereon and flexible members for embracing a wheel supporting member adjacent each caliper-like lever and having means for adjustably attaching them to the respective attachment means.

Further objects of the invention will appear from the following description.

Embodiments of the invention are illustrated by way of example by the accompanying drawings in which:

Figure 1 is a perspective view of one form of adjustable anchorage according to the invention.

Figure 2 is a perspective view of the adjustable anchorage shown in Figure 1 inclined from the opposite side, and showing the parts thereof in exploded relation.

Figure 3 is a perspective view of a part of a bicycle adjacent the front brake with adjustable anchorages according to the invention in position on the caliper levers.

Figure 4 is a section on the line 4—4 of Figure 3.

Figures 5 to 8 are views corresponding respectively to Figures 1 to 4, showing a different form of adjustable anchorage according to the invention.

In the embodiment of Figures 1 to 4 an adjustable anchorage device comprises a slotted plate 10 having a slot 11, and a flexible member 12 which in this embodiment is fomed from stranded steel cable such as used in Bowden cables, and the part which fits round the fork blade has a protective covering 13 of plastic or rubber to prevent the enamel or other finish of the fork blade from being scratched. The flexible member 12 has an abutment nipple 14 secured to one end, for example by soldering.

An eye 15 is formed at one end of the slotted plate 10, through which the flexible member 12 may be passed, and which will receive and retain the abutment nipple 14 for anchoring that end of the flexible member. The other end of the flexible member 12 may be passed through a transverse hole 16 in a screw clamp pin 17 which is passed through a receiving hole 18 in the slotted plate. A washer 19 and nut 20 engage the screw-threaded end of the pin 17 for clamping the end of the flexible member between the head 21 of the screw clamp 17 and the slotted plate 10.

In use, as shown in Figures 3 and 4, a slotted plate 10 is mounted on the end of each caliper-like lever 22 of the cycle brake. As shown, the caliper levers usually terminate in a part having a slot 23 through which passes a stud 24 for securing the brake block 25, and which allows for adjustment of the brake block to bring it into proper alignment with the rim 26 of the cycle wheel. The slotted plate is mounted on the caliper lever 22 by means of the stud 24 and with its slot 11 in alignment with the slot 23 of the caliper lever. For securing the slotted plate 10 against rotation on the stud 23, a tongue 27 is pressed out from the plate 10 and enters the slot 23 of the caliper lever, as seen in Figure 4.

With the slotted plate 10 mounted in position as described, the flexible member is passed through the eye 15 so that its abutment nipple 14 is received therein, and is then passed around the adjacent fork blade 28. Its free end is then passed through the hole 16 in the screw clamp pin, and after adjustment to give a loop around the fork blade suitable for preventing undue forward movement of the caliper lever, whilst permitting free normal operation of the brake, the nut of the screw clamp pin is tightened to secure the free end of the flexible member.

In the embodiment of Figures 5 to 8, various parts are identical both functionally and constructionally to parts of the embodiment of Figures 1 to 4, and are similarly referenced. The means for attaching the ends of the flexible member 12 to the slotted plate 10, however, are different.

The flexible member 12 has an abutment nipple 14 secured at each end after it has been passed through an externally screw threaded sleeve 30. Spaced eyes 31 are formed at the end of the slotted plate by rolling tongues of the plate into the desired shape, and are of such size as to receive the sleeve 30 as a sliding fit. Prior to inserting the sleeve 30, a knurled nut 32 is located between the eyes 31 to engage the external screw thread of the sleeve 30 for facilitating axial adjustment of its position in the eyes 31. A second eye 33 is formed on the other side of the plate 10 by rolling a tongue of the plate formed between the eyes 31. A longitudinal gap 34 is left between the end of the tongue and the plate so that the flexible member 12 may be passed laterally into the eye 33 and then drawn back to engage the abutment nipple 14 in the eye, as seen in Figure 5.

With the slotted plate mounted on the caliper lever, the sleeve 30 is placed in the eyes 31, rotating the nut 32 to admit it, and after passing around the fork blade 28, the other end of the flexible member is engaged in the eye 33 as described above. The knurled nut 32 may then be rotated to move the sleeve 30 axially in the eyes 31, and so to adjust the length of the loop around the fork as desired.

Whilst the invention has been described with reference to embodiments in which the attachment means for the ends of the flexible member are formed on slotted plates for mounting the end of a caliper lever, they could if desired be formed on the caliper lever itself. For example an eye 15 and a hole 18 for receiving a screw clamp pin 17 could be formed on the caliper lever as described with reference to the first-mentioned embodiment. Alternately the caliper lever could be formed with first and second eye means for receiving the sleeve 30 and the abutment nipple 14 respectively. Other means for attaching one or both ends of the flexible member to the caliper lever or to a member for mounting on the caliper lever may alternatively be used without departing from the scope of the invention.

I claim:

1. A rim brake assembly for the wheel of a cycle, said wheel being mounted for rotation between fork members having portions adjacent the rim of said wheel, said assembly comprising a pair of caliper-like levers, brake blocks secured on the ends of said levers, operating means acting on said levers to bring said blocks into engagement with opposite sides of said rim, flexible metallic stranded cables, said cables each having first and second ends and an intermediate portion, a rigid connection between the first end of each of said cables and an associated one of said caliper-like levers at a point adjacent the corresponding block, said intermediate portion forming a loop passing around one of said fork members, and an adjustable connection between said second end of the cable and said associated caliper-like lever at said point adjacent the corresponding block.

2. A rim brake assembly according to claim 1, wherein said rigid connection comprises a slotted plate secured to said lever, and said plate also carries said adjustable connection.

3. A rim brake assembly according to claim 2, wherein said adjustable connection comprises a screw clamp having a transverse hole through which said second end of the cable passes.

4. An adjustable anchorage for a cycle brake of the kind having a pair of caliper-like levers carrying brake blocks mounted thereon by studs and means for mounting the caliper-like levers on wheel-supporting members of a cycle frame comprising slotted plates for mounting one on the brake block mounting stud of each caliper-like lever and flexible cables for embracing the wheel-supporting member adjacent each caliper-like lever, an externally screw-threaded sleeve passed freely over each flexible cable and abutment members secured one to each end of each flexible cable and retaining the sleeves thereon longitudinally gapped first eye means on each slotted plate for receiving a flexible cable and for retaining an abutment member thereof, spaced second eye means on each slotted plate for slidably receiving the externally screw-threaded sleeve of the respective flexible cable and a nut for location between the spaced second eye means of each slotted plate and for engaging the externally screw threaded sleeve for adjustably retaining it within the spaced second eye means.

5. An adjustable anchorage according to claim 4 wherein the first and second eye means are formed by tongues on the slotted plates rolled into the desired form by an operation with press tools.

References Cited in the file of this patent

FOREIGN PATENTS

| | | |
|---|---|---|
| 25,954 | Great Britain | Nov. 23, 1907 |
| 540,628 | Great Britain | Oct. 23, 1941 |